United States Patent [19]
Molson

[11] Patent Number: 5,819,449
[45] Date of Patent: Oct. 13, 1998

[54] PROTECTIVE NONSTICK COVER FOR LICENSE PLATE

[76] Inventor: William Molson, 3602 Mobile Ct., Cleveland, Ohio 44109

[21] Appl. No.: 797,094

[22] Filed: Feb. 7, 1997

[51] Int. Cl.[6] ....................................................... G09F 7/00
[52] U.S. Cl. .................................. 40/200; 40/615; 40/616
[58] Field of Search ............................. 40/200, 201, 209, 40/612, 615, 616

[56] References Cited

U.S. PATENT DOCUMENTS

| | | |
|---|---|---|
| 2,190,571 | 2/1940 | Salducco . |
| 2,400,079 | 5/1946 | Ducey . |
| 3,069,793 | 12/1962 | Francescon . |
| 4,077,145 | 3/1978 | Smoczynski .......................... 40/200 X |
| 4,409,287 | 10/1983 | Harrison . |
| 4,874,226 | 10/1989 | McDonald . |
| 5,149,571 | 9/1992 | Croell . |
| 5,488,790 | 2/1996 | Blauer . |

FOREIGN PATENT DOCUMENTS

| | | | |
|---|---|---|---|
| 679435 | 4/1966 | France ..................................... | 40/200 |
| 2543499 | 10/1984 | France ..................................... | 40/200 |
| 2062408 | 7/1971 | Germany ................................. | 40/200 |
| 2748708 | 5/1979 | Germany ................................. | 40/200 |
| 1002332 | 3/1983 | U.S.S.R. ................................. | 40/200 |
| 1403583 | 8/1975 | United Kingdom ..................... | 40/200 |
| 2222904 | 3/1990 | United Kingdom ..................... | 40/200 |

*Primary Examiner*—William Stryjewski
*Attorney, Agent, or Firm*—Pearne, Gordon, McCoy & Granger LLP

[57] ABSTRACT

A protective nonstick cover for a standard automobile license plate having a nonstick surface which is easy to clean, protects the license plate, and enhances and/or improves the appearance of the license plate. The standard license plate is generally rectangularly-shaped and has a front surface with identification characters embossed therein. The protective nonstick cover includes a generally rectangularly-shaped and generally flexible plastic film sized to closely match the front surface of the license plate and a pressure-sensitive adhesive layer applied directly to a rear surface of the plastic film. The adhesive layer secures the plastic film to the entire front surface of the license plate to form a laminate. The plastic film and the adhesive layer are transparent when attached to the license plate so that the identification characters of the license plate are visible therethrough. Preferably, the plastic film is an ethylene based unplasticized ionomer film.

18 Claims, 1 Drawing Sheet

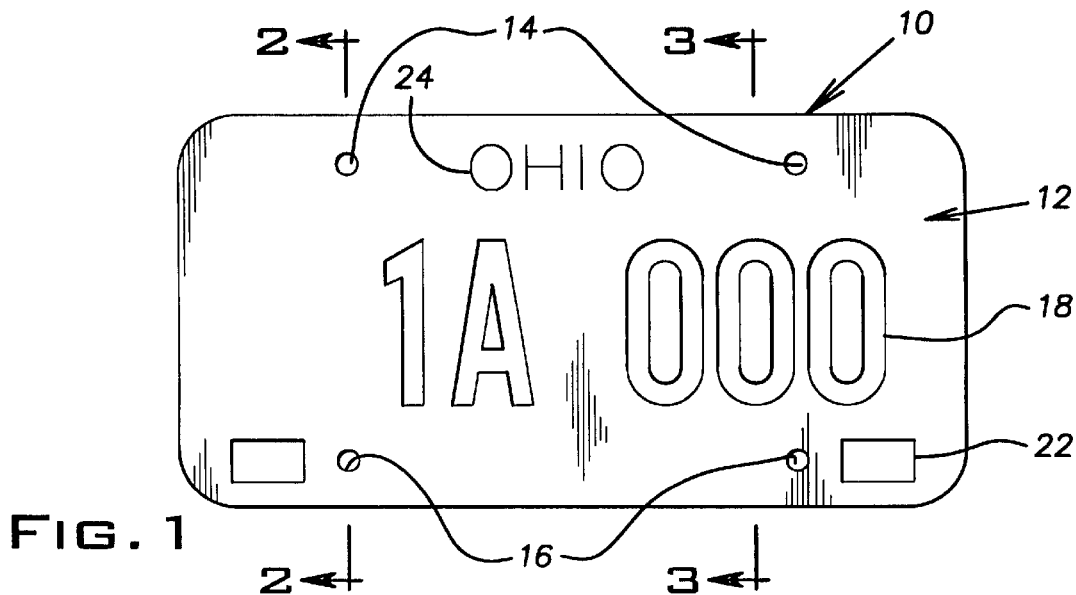
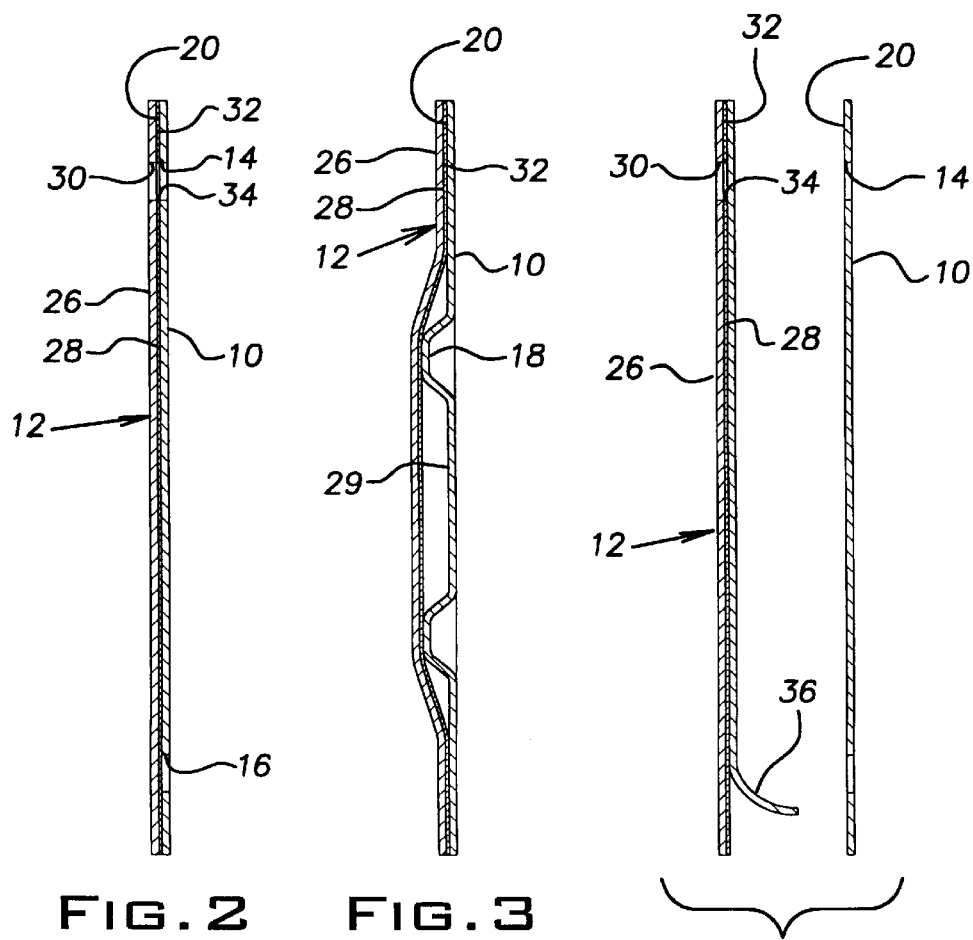

PROTECTIVE NONSTICK COVER FOR LICENSE PLATE

BACKGROUND OF THE INVENTION

The present invention generally relates to covers for license plates and, more specifically, to protective nonstick covers for standard automobile license plates.

Automobile license plates are often damaged by stones or other road debris. Nicks and scratches caused by the debris can lead to rust which causes the license plate to become unsightly and therefore decreases the aesthetics of the automobile. The rust can even partially or totally obscure nomenclature on the license plate. The license plates are also often dirty due to dead insects, oil, grease, tar, or other road grime. The grime, particularly dead insects, are very difficult to remove from the license plate. The grime can make the license plate difficult to read and also decreases the aesthetics of the license plate and therefore the aesthetics of the automobile. The damage and dirt can accumulate so that the license plate is very unappealing and possibly even totally obscured. The license plates, which are usually not replaced every year, must then be replaced.

Several types of protective covers have been utilized to prevent damage to the license plate. One type of protective cover is molded of a hard plastic material and forms a frame which extends around the periphery of the plate. This type of cover is subject to pitting, chipping, cracking, and breaking which is similar to the problem that the covers are trying to solve. The covers also tend increase the dimensions of the license plate and may not fit in recessed areas of some automobiles. The covers also cannot be used with license plate frames which are often used to provide a decorative effect. The frames are also often used for advertising.

Another type of protective cover is a sheet of acrylic material which is cut to exactly the same dimensions as the license plate. The road debris, however, will nick, chip, and pit the acrylic material. Furthermore, dead and dried insects are as difficult to remove from these covers as they are from the license plate. Accordingly, there is a need in the art for an improved protective cover for an automobile license plate which gives even an old license plate an attractive "look and feel", has a nonstick surface which helps the license plates stay clean and easy to read, protects and preserves the license plate from damage, won't pit or chip from road debris, won't crack or break from being bumped by other vehicles, works with or without a license plate frame, does not substantially change the dimensions of the license plate, is easy to install, and/or is less expensive than a replacement license plate.

BRIEF SUMMARY OF THE INVENTION

The present invention provides a protective nonstick cover for a standard automobile license plate which overcomes at least some of the above-noted problems of the related art. The protective nonstick cover is for a standard metal license plate having a front surface with identification characters embossed therein and includes a generally rectangularly-shaped flexible plastic film covering the front surface of the license plate and an adhesive layer between the plastic film and the license plate for securing the plastic film to the front surface of the license plate. The plastic film and the adhesive layer are each generally transparent when attached to the license plate such that the identification characters of the license plate are visible therethrough. The plastic film, adhesive layer, and license plate form a laminated plate which provides an attractive "look and feel".

In a preferred embodiment, the plastic film is a polyethylene ionomer film which provides a surface which is generally resistant to insects sticking thereto and does not pit, scratch, or crack from road debris and other hazards. Preferably, the adhesive layer is a pressure sensitive acrylic adhesive so that the plastic film can be easily installed and removed if necessary.

BRIEF DESCRIPTION OF THE SEVERAL VIEWS OF THE DRAWING

These and further features of the present invention will be apparent with reference to the following description and drawings, wherein:

FIG. 1 is a front elevational view of a protective nonstick cover according to the present invention secured to a standard license plate for an automobile;

FIG. 2. is a cross-sectional view of the license plate and protective nonstick cover taken along line 2—2 of FIG. 1;

FIG. 3 is a cross-sectional view of the license plate and protective nonstick cover taken along line 3—3 of FIG. 1; and FIG. 4 is a cross-sectional view of the license plate and protective nonstick cover similar to FIG. 2 but during installation of the protective nonstick cover.

DETAILED DESCRIPTION OF THE INVENTION

FIGS. 1–3 illustrate a license plate 10 for an automobile having a protective nonstick cover 12 according to the present invention attached thereto. The license plate 10 is of standard U.S. construction, that is, the license plate 10 is generally rectangular having a length of about 12 inches and a height of about 6 inches. The license plate 10 also includes standardized placement of two pairs of mounting holes or openings 14, 16 formed through the license plate 10. A pair of upper mounting holes 14 are positioned near the upper edge of the license plate 10 and a pair of lower mounting holes 16 are positioned near the lower edge of the license plate 10. Each pair of mounting holes 14, 16 is located in identically symmetrical and standard positions.

The license plate 10 is formed of metal and has unique alpha-numeric identification characters 18 stamped therein in a standard manner. As best shown in FIG. 3, the identification characters 18 are embossed, that is, the identification characters 18 are raised from the front surface 20 of the license plate 10. As shown in FIG. 1, the regulatory agency of the state issuing the license plate 10 typically requires the license plate 10 to include issuance or validation stickers 22 and the name 24 of the issuing state at specific locations on the front surface 20 of the license plate 10. All of this information (the identification characters 18, the issuance stickers 22, and the state name 24) on the front surface 20 of the license plate 10, must be visible when the license plate 10 is secured to an automobile.

As best shown in FIG. 2, the protective nonstick cover 12 includes a plastic film or sheet 26 and a layer of adhesive 28 securing the plastic film 26 to the front surface 20 of the license plate 10. The plastic film 26 is relatively thin, generally transparent, generally flexible, abrasion resistant, and weather resistant. The plastic film 26 is relatively thin and preferably has a thickness of less than about 0.020 inches. More preferably the plastic film 26 has a nominal thickness of either about 8 mils or about 10 mils. Note that the nominal thickness of the plastic film 26 may vary by approximately +/−1 mil.

The plastic film 26 is made of a material which is generally transparent and is preferably clear. The term "generally transparent" includes everything from clear to translucent in which the information 18, 22, 24 on the license plate 10 is visible therethrough when the protective nonstick cover 12 is attached to the license plate 10. Accordingly, the plastic film 26 can contain pigments and/or dyes to provide tinting in any color which is desired, as long as the information 18, 22, 24 on the front of the license plate 10 remains visible when the plastic film 26 is attached to the license plate 10.

The plastic film 26 is preferably made of a material which is generally flexible. The term "generally flexible" means that the plastic film 26 is at least flexible enough to partially or generally conform to the embossed front surface 20 of the license plate 10 as shown in FIG. 3. It is noted, however, that the plastic film 26 does not have to be flexible enough to exactly conform to the embossed front surface 20 of the license plate 10, particularly the relatively small, "low areas" 29 or abrupt changes within or between the identification characters 18. The plastic film 26 does not have to conform to the low areas 29 because the plastic film 26 contacts the high areas surrounding the low areas and is rigid enough to ride over, without contacting, the low areas. In fact, it is this characteristic of the plastic film 26, i.e. to smooth over the embossed front surface 20 of the license plate 10, that enhances its nonstick properties which will be discussed in more detail hereafter. It eliminates the small, low areas 29 of the license plate 10 which are difficult to wipe and clean.

The plastic film 26 is abrasion resistant to prevent chipping, nicking, pitting, and scratching by stones and other road debris. The plastic film 26 is weather resistant so that it is not damaged by rain or snow and preferably does not yellow with time or from exposure to sunlight. The plastic film 26 can be made more resistant to sunlight by the inclusion of certain UV stabilizers and other additives.

The material of the plastic film 26 is preferably an ethylene based ionomer resin and more preferably an ethylene based unplasticized ionomer resin. Unplasticized ionomer resins can contain small amounts of various additives such as but not limited to antiblocking agents, slip agents, roll release agents, and antioxidants since these are not considered plasticizers. It is noted that other suitable materials such as, for example, polyurethane can be utilized. A nice property of polyethylene ionomers is that they are transparent, unlike polyethylene itself, which is somewhat hazy. Polyethylene ionomer films also have the advantage of moderate cost along with excellent overall toughness. An important and unanticipated feature of the polyethylene ionomer film is the nonstick qualities and properties it imparts to license plates. The term "nonstick" means having characteristics, qualities, or properties which facilitate the removal of dirt and other foreign matter, particularly insects, from a surface by rain or actual washing and/or wiping and includes characteristics, qualities, or properties which resist the adherence of dirt and other foreign matter to the surface unlike unprotected license plates and other rigid plastic license plate protectors that are not "generally flexible". For example, dead insects do not readily adhere to the film and can be easily removed by wiping with a damp cloth, unlike other parts of the automobile. Also, the nonstick surface helps the license plate 10 stay clean and easy to read. A polyethylene ionomer resin which is readily available and provides particularly good results is SURLYN, available from the Dupont Corporation.

The plastic film 26 is sized and shaped to closely conform to and cover the entire front surface 20 of the license plate 10. Therefore, the plastic film 26 is generally rectangularly-shaped having a length of about 12 inches and a height of about 6 inches. Preferably, the plastic film 26 is die cut to the exact peripheral shape and dimensions of the license plate 10.

The plastic film 26 is provided with a pair of precut mounting openings 30 (only one is visible in FIG. 2) near an edge of the plastic film 26. The openings 30 are sized and positioned to cooperate with either pair of mounting openings 14, 16 in the license plate 10 depending on the orientation of the plastic film 26. Preferably, only one pair of openings 30 are provided to cooperate with either pair of mounting openings 14, 16 in the license plate 10. If additional openings are required to cooperate with the second pair of mounting openings 14, 16 in the license plate 10, the installer can easily cut such openings in the plastic film 26 before or after installation onto the license plate 10 by using the appropriate pair of mounting openings 14, 16 of the license plate 10 as a guide. Alternatively, the plastic film 26 can be provided with a second pair of precut mounting openings positioned to cooperate with the second pair of mounting openings 14, 16 of the license plate 10. Each pair of openings 30 in the plastic film 26 is located in identically symmetrical and standard positions similar to the mounting openings 14, 16 in the license plate 10.

The adhesive layer 28 is relatively thin and preferably has a thickness less than about 0.004 inches. More preferably, the adhesive layer 28 has a thickness in the range of about 1 mil to about 3 mils and most preferably has a thickness of about 2 mils. The adhesive layer 28 is generally transparent, and is preferably clear, when attached to the license plate 10. However, the adhesive layer 28 can contain pigments and/or dyes to provide tinting in any color which is desired, as long as the information 18, 22, 24 on the front of the license plate 10 remains visible when the adhesive layer 28 is attached to the license plate 10. The adhesive layer 28 also provides adequate adhesion for the plastic film 26 so that the plastic film 26 is secured to the front surface 20 of the license plate 10. A particularly well suited adhesive layer 28 is a solvent based acrylic adhesive.

The adhesive layer 28 is sized and shaped to closely conform to and cover the entire rear or back surface 32 of the plastic film 26 and the entire front surface 20 of the license plate 10. Therefore, the adhesive layer 28 is generally rectangularly-shaped having a length of about 12 inches and a height of about 6 inches. Preferably, the adhesive layer 28 is die cut, along with the plastic film 26, to the exact peripheral shape and dimensions of the license plate 10. The adhesive layer 28 is also provided with a pair of precut openings 34 (only one is visible in FIG. 2) which cooperate with the openings 30 in the plastic film 26 and either pair of mounting openings 14, 16 in the license plate 10.

The adhesive layer 28 is preferably a pressure-sensitive type adhesive, that is, an adhesive which adheres to an article when pressed against it. It is noted, however, that other types of adhesive such as, for example, heat activated adhesives can be utilized. In the preferred embodiment, the adhesive layer 28 is applied directly to the back surface 32 of the plastic film 26 so that the protective nonstick cover 12 is self-adhering. The back surface 32 of the plastic film 26 is preferably "corona treated" prior to the application of the adhesive layer 28 to increase and improve the adhesive layer's adherence thereto.

As best shown in FIG. 4, a release backing, liner or film 36 (shown partially removed) is affixed to the adhesive layer 28 to protect the adhesive layer 28 prior to installation of the protective nonstick cover 12 onto the license plate 10. The release backing 36 can be of any suitable material such as, for example, kraft paper coated with polyethylene and/or silicone, poly film, or polyester film. The preferred choice is coated kraft paper since it adds stiffness and body to the plastic film 26 and adhesive layer 28 prior to its removal and is easy to remove.

The protective nonstick cover 12 is installed onto the license plate 10 by peeling away the release backing 36 from the protective nonstick cover 12 to expose the adhesive layer 28. The exposed adhesive layer 28 is placed directly onto the front surface 20 of the license plate 10. Note that the protective nonstick cover 12 must be properly aligned with the license plate 10 and either pair of mounting openings 14, 16. Light pressure is placed onto the protective nonstick cover 12 to partially secure the protective nonstick cover 12 to the license plate 10.

After checking the alignment of the protective nonstick cover 12 with the license plate 10, greater pressure is applied to the protective nonstick cover 12 to generally conform and securely adhere the protective nonstick cover 12 to the front surface 20 of the license plate 10, particularly near the periphery of the front surface 20 of the license plate 10. A liquid-tight seal is thus preferably formed around the periphery of the front surface 20 of the license plate 10 between the protective nonstick cover 12 and the license plate 10. The seal prevents liquids such as, for example, salty water from melted snow and road salt from contacting the front surface 20 of the license plate 10 to help prevent rust from forming thereon.

New validation stickers 22 can be added at anytime by first warming the protective nonstick cover 12 with a hair dryer and then slowly peeling away the protective nonstick cover 12 just enough to apply new validation stickers 22 directly to the license plate 10 and then repositioning the protective nonstick cover 12. In the same manner, the protective nonstick cover 12 can be removed completely at anytime without damage to the license plate 10 by first warming the protective nonstick cover 12 with a hair dryer. The protective nonstick cover 12 is not intended to be rejoined to the license plate 10 if the protective nonstick cover 12 is removed completely after being attached and used in service.

Attached correctly in this manner, the protective nonstick cover 12 and license plate 10 form a laminated plate which is easy to clean and is protected from damage by road debris. Additionally, an aesthetically pleasing "laminated look and feel" and/or "glossy look" is obtained which enhances the attractiveness of the license plate and even improves the appearance of older or slightly damaged license plates.

Although particular embodiments of the invention have been described in detail, it will be understood that the invention is not limited correspondingly in scope, but includes all changes and modifications coming within the spirit and terms of the claims appended hereto.

What is claimed is:

1. A laminated license plate for an automobile comprising:

a standard metal license plate having a front surface with identification characters embossed therein, said front surface including a primary surface and raised surfaces spaced from said primary surface and forming said identification characters;

a generally rectangularly-shaped and generally flexible plastic film continuously covering said front surface of said license plate; and an adhesive layer between said plastic film and said license plate for securing said plastic film to said front surface of said license plate, said plastic film and said adhesive layer each being generally transparent when attached to said license plate such that said identification characters of said license plate are visible therethrough, wherein said plastic film partially conforms to said front surface with said plastic film adhered to said raised surfaces and a portion of said primary surface but not adhered to other portions of said primary surface adjacent said identification characters and between said identification characters.

2. The laminated license plate according to claim 1, wherein said plastic film is an ethylene based ionomer film.

3. The laminated license plate according to claim 2, wherein said plastic film is an unplasticized ionomer film.

4. The laminated license plate according to claim 1, wherein said plastic film is a nonstick plastic film and has a thickness of less than about 0.020 inches.

5. The laminated license plate according to claim 1, wherein said adhesive layer is a pressure-sensitive acrylic adhesive.

6. The laminated license plate according to claim 5, wherein said adhesive layer has a thickness of less than about 0.004 inches.

7. The laminated license plate according to claim 6, wherein said adhesive layer is applied directly to a back surface of said plastic film.

8. The laminated license plate according to claim 1, wherein said license plate has at least one pair of mounting openings located near an edge of said license plate and said plastic film and said adhesive layer each have at least one pair of openings sized and located to cooperate with said at least one pair of mounting openings in said license plate.

9. The laminated license plate according to claim 8, wherein said license plate has two pairs of mounting openings and said plastic film and said adhesive layer each overlay one pair of said two pairs of mounting openings in said license plate.

10. The laminated license plate according to claim 1, wherein said plastic film and said adhesive layer each have a size and peripheral shape substantially the same as said license plate.

11. A protective nonstick cover and a standard automobile license plate comprising:

the license plate having a front surface with identification characters embossed therein;

a generally rectangularly-shaped and generally flexible plastic film having a size substantially the same as the license plate and continuously covering said front surface, wherein said plastic film has a nominal thickness of about 8 to about 20 mils; and an adhesive layer between said license plate and said plastic film for securing said plastic film to the front surface of the license plate, said plastic film and said adhesive layer each being generally transparent when attached to the license plate such that the identification characters of the license plate are visible therethrough.

12. The protective nonstick cover according to claim 11, wherein said plastic film is an ethylene based ionomer film.

13. The protective nonstick cover according to claim 12, wherein said plastic film is an unplasticized ionomer film.

14. The protective nonstick cover according to claim 11, wherein said adhesive layer is a pressure-sensitive acrylic adhesive.

15. The protective nonstick cover according to claim 14, wherein said adhesive layer has a thickness of less than about 0.004 inches.

16. The protective nonstick cover according to claim 11, further comprising a removable release liner applied to said adhesive layer.

17. The protective nonstick cover according to claim 11, wherein said plastic film and said adhesive layer each have at least one pair of openings sized and located to cooperate with the at least one pair of mounting openings in the license plate.

18. The protective nonstick cover according to claim 11, wherein said protective nonstick cover has a peripheral shape substantially the same as the license plate.

* * * * *